United States Patent
Chiba

(10) Patent No.: US 9,405,999 B2
(45) Date of Patent: Aug. 2, 2016

(54) IMAGE FORMING APPARATUS

(71) Applicant: CANON KABUSHIKI KAISHA, Tokyo (JP)

(72) Inventor: Shinichi Chiba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/229,537

(22) Filed: Mar. 28, 2014

(65) Prior Publication Data

US 2014/0293350 A1    Oct. 2, 2014

(30) Foreign Application Priority Data

Apr. 1, 2013    (JP) ................... 2013-075973

(51) Int. Cl.
| | |
|---|---|
| G06F 15/00 | (2006.01) |
| G06K 15/00 | (2006.01) |
| H04N 1/00 | (2006.01) |
| G06K 15/02 | (2006.01) |
| G06F 3/12 | (2006.01) |

(52) U.S. Cl.
CPC .............. *G06K 15/005* (2013.01); *G06F 3/122* (2013.01); *G06F 3/128* (2013.01); *G06F 3/1229* (2013.01); *G06F 3/1256* (2013.01); *G06F 3/1285* (2013.01); *H04N 1/00458* (2013.01); *G06F 3/126* (2013.01); *G06F 3/1208* (2013.01); *G06K 15/1801* (2013.01)

(58) Field of Classification Search
None
See application file for complete search history.

(56) References Cited

U.S. PATENT DOCUMENTS

| | | | | |
|---|---|---|---|---|
| 2006/0050313 | A1* | 3/2006 | Hashimoto et al. | 358/1.15 |
| 2008/0235612 | A1* | 9/2008 | Nakagawa | 715/772 |
| 2012/0224224 | A1* | 9/2012 | Furumoto et al. | 358/1.15 |
| 2013/0290576 | A1* | 10/2013 | Shigenobu | 710/74 |

FOREIGN PATENT DOCUMENTS

JP    2011-008632 A    1/2011

* cited by examiner

*Primary Examiner* — Helen Q Zong
(74) *Attorney, Agent, or Firm* — Canon USA, Inc. I.P. Division

(57) ABSTRACT

A printing apparatus includes a display unit configured to provide a preview display of image data stored in a memory, and an execution unit configured to execute a print job transmitted from an external apparatus. If the print job is transmitted from the external apparatus during the preview display, the display unit displays a screen for changing the preview display to a list display of the image data.

11 Claims, 10 Drawing Sheets

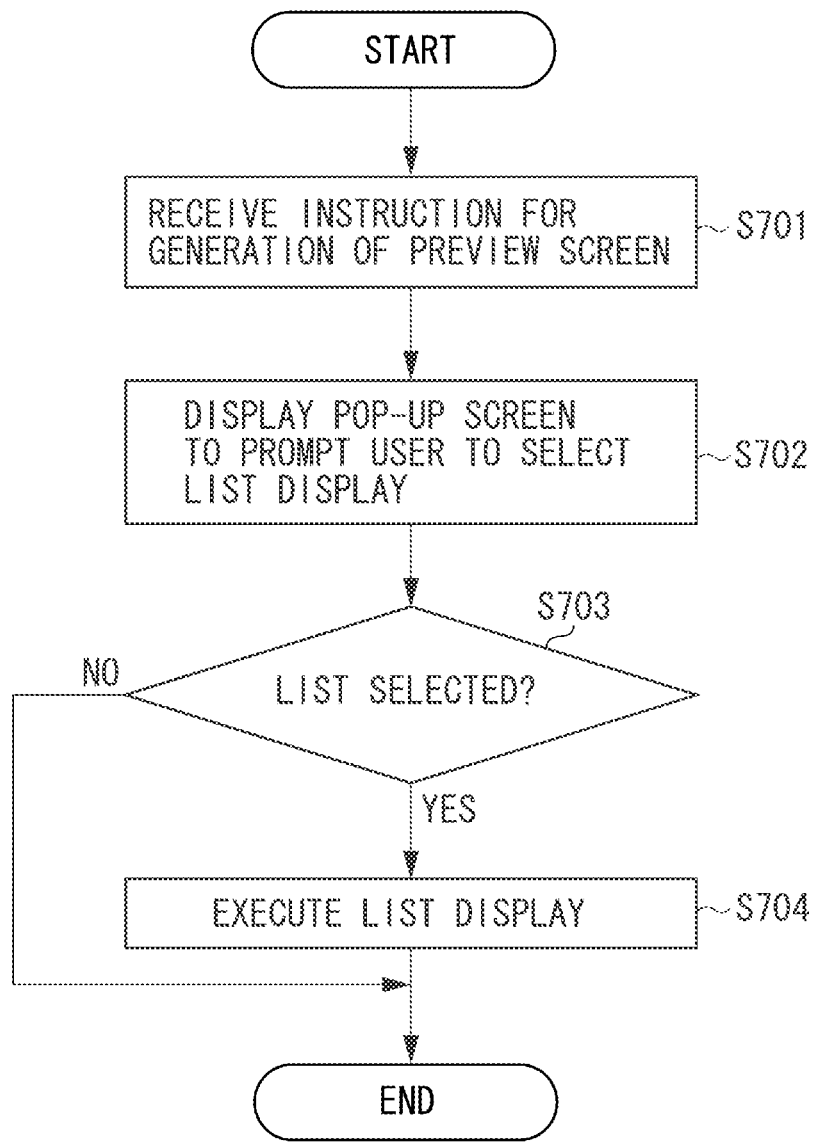

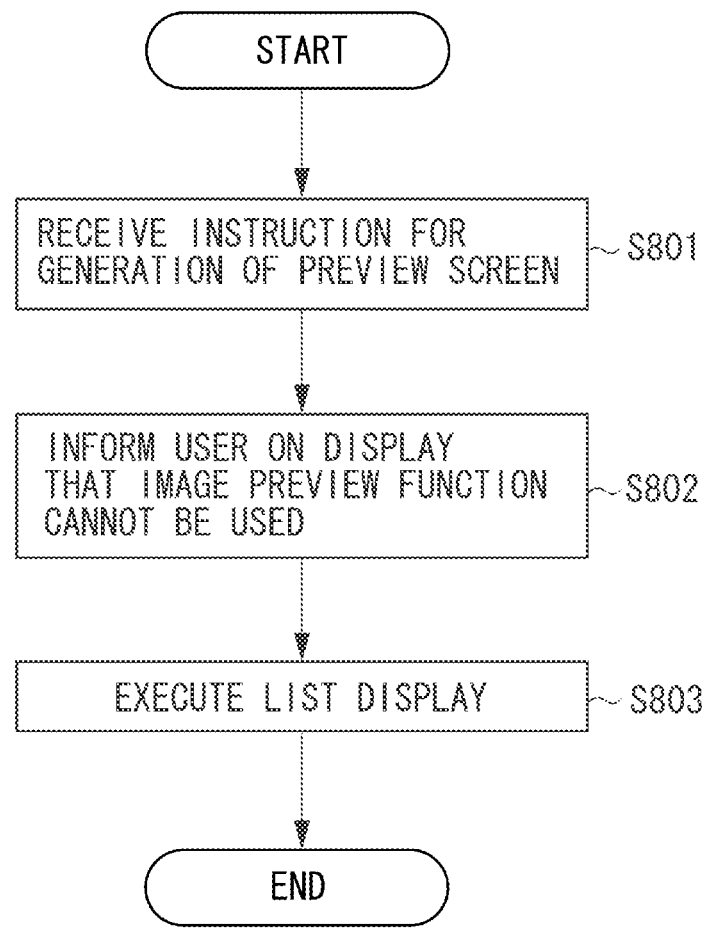

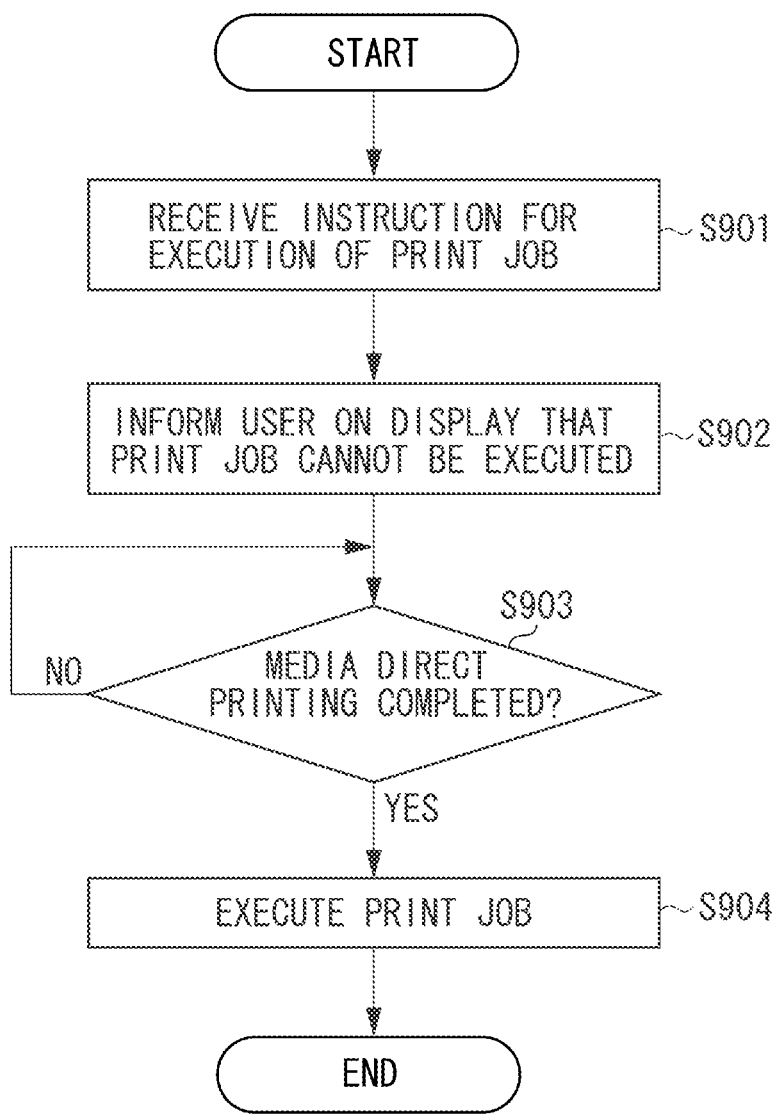

IMAGE FORMING APPARATUS

BACKGROUND

1. Field

Aspects of the present invention generally relate to an image forming apparatus including a plurality of functions.

2. Description of the Related Art

Image forming apparatuses that can make direct access to removable media such as universal serial bus (USB) memories without using other information processing apparatuses such as personal computers are in widespread use. Such image forming apparatuses have a so-called "media direct printing" function, which is a function of directly printing an image file recorded in a removable medium.

Some of the image forming apparatuses having the media direct printing function have a function of displaying a preview image (hereinafter, referred to as an "image preview function") for selecting an image file to be printed. The image preview function allows a user to select an image file to be printed while viewing images. Therefore, the possibility of printing an image file by mistake decreases.

To generate preview images, image processing needs to be performed. Therefore, the image preview function requires a resource for image processing. In a case where a resource conflict occurs with other processing that requires a resource for image processing, either of them cannot be executed. For example, when an instruction for execution of a print job is issued during execution of the image preview function, the print job is placed in a standby state until completion of the image preview function, since the resource for image processing is being used for the image preview function.

Conventionally, in order to avoid such a state, a plurality of preview image display methods is prepared, and according to the resource usage status of a print job, a method executable with the remaining resource is used for generating a preview image. In the configuration discussed in Japanese Patent Application Laid-Open No. 2011-008632, a resource conflict status is identified, and according to the conflict status, a resource and a preview image display method are selected.

In a case where the preview image display method is changed according to the conflict status as discussed in Japanese Patent Application Laid-Open No. 2011-008632, a resource free from conflict is needed. In an inexpensive compact multifunction peripheral (MFP) (hereinafter, referred to as a CMFP), however, such an extra resource is not prepared. Therefore, the technique discussed in Japanese Patent Application Laid-Open No. 2011-008632 cannot be used.

Further, in the case of a resource conflict between an image preview function that does not involve the operation of a printer engine and a print job that involves the operation of a printer engine, the display method is switched without providing any notification to a user. This causes confusion to the user who does not know the occurrence of resource conflict.

Still further, in the configuration discussed in Japanese Patent Application Laid-Open No. 2011-008632, the display method is switched without receiving permission of a user who is using the image preview function. This impairs the usability for the user using the image preview function.

SUMMARY OF THE INVENTION

Aspects of the present invention are generally directed to an image forming apparatus capable of executing processing efficiently with a small number of resources even in a case where a resource conflict occurs According to an aspect of the present invention, a printing apparatus includes a display unit configured to provide a preview display of image data stored in a memory, and an execution unit configured to execute a print job transmitted from an external apparatus. If the print job is transmitted from the external apparatus during the preview display, the display unit displays a screen for changing the preview display to a list display of the image data.

Further features of the present disclosure will become apparent from the following description of exemplary embodiments with reference to the attached drawings.

BRIEF DESCRIPTION OF THE DRAWINGS

FIGS. 5A and 5B are flowcharts each illustrating a processing procedure when a resource conflict occurs.

FIG. 6 is a flowchart illustrating a processing procedure when a resource conflict occurs.

FIGS. 7A and 7B are flowcharts each illustrating a processing procedure when a resource conflict occurs.

DESCRIPTION OF THE EMBODIMENTS

Various exemplary embodiments will be described in detail below with reference to the drawings.

Figure 1:
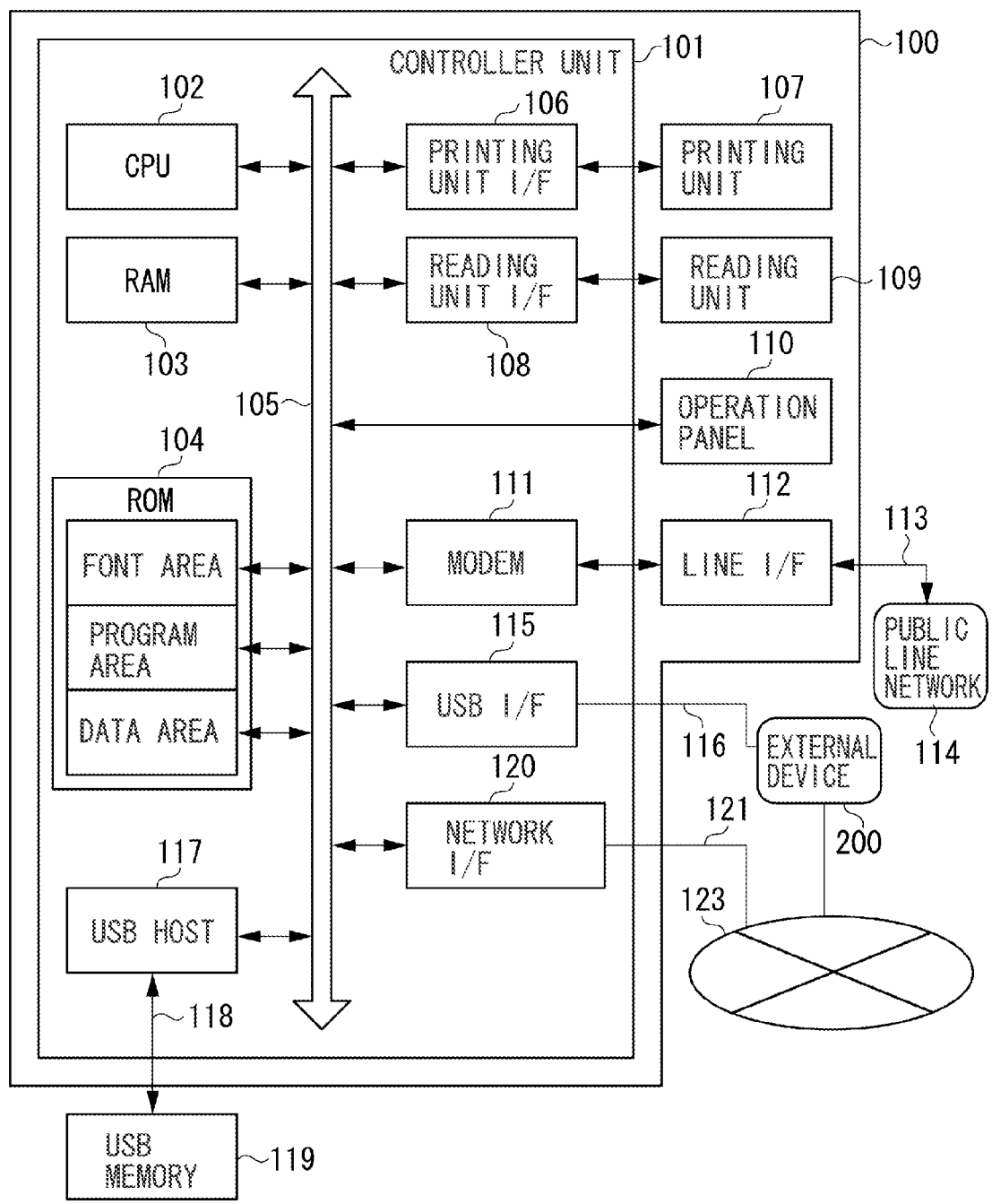
FIG. 1 illustrates a configuration of an image forming apparatus.

FIG. 1 illustrates a configuration of an image forming apparatus according to a first exemplary embodiment. An image forming apparatus 100 includes a printing unit 107, a reading unit 109, an operation panel 110, a line interface (I/F) 112, and a controller unit 101. The controller unit 101 controls the entire operation of the image forming apparatus 100.

The controller unit 101 includes a central processing unit (CPU) 102. The CPU 102 controls the operation of each component in the controller unit 101. To perform this control, the CPU 102 reads out and executes various types of control programs stored in a program area of a read only memory (ROM) 104. The CPU 102 uses a random access memory (RAM) 103 as a work area during the execution of the programs. The various types of control programs may be read out from a mass-storage device (not illustrated) such as a hard disk drive. The various types of control programs are stored, for example, in a compressed state, and are decompressed and loaded into the RAM 103 for execution.

The CPU 102 displays characters and symbols on a display unit of the operation panel 110 by using font information stored in a font area of the ROM 104. This enables various types of messages to be displayed. The CPU 102 receives, via the operation panel 110, instruction information that indicates a user's instruction. For this purpose, the operation panel 110 has such a configuration that a display unit and an input device are integrally configured.

Further, the CPU 102 stores in a data area of the ROM 104 information such as device information of the image forming apparatus 100, user's telephone directory information, and department management information. The data area is rewritable, and the CPU 102 reads such information from the data area or updates the information as required.

The controller unit 101 further includes, as the other components, a printing unit I/F 106, a reading unit I/F 108, a modem 111, a USB I/F 115, a USB host 117, and a network I/F 120. These components are communicably connected to one another by a system bus 105.

The network I/F 120 controls communication with an external device 200 via a network 123 such as a local area network (LAN). The external device 200 is an information processing apparatus such as a personal computer, for example. The network I/F 120 and the network 123 are connected to each other via a communication cable 121 such as a LAN cable. Further, the controller unit 101 is capable of communicating with the external device 200 via the USB I/F 115. The USB I/F 115 is connected to the external device 200 via the USB cable 116. The external device 200 inputs an execution instruction of a print job or the like to the image forming apparatus 100 via the network I/F 120 or the USB I/F 115.

The modem 111 is connected to a public line network 114 via the line I/F 112, and controls communication with another image forming apparatus, a facsimile apparatus, a telephone or the like (not illustrated). The line I/F 112 and the public line network 114 are connected to each other via a telephone line 113.

The printing unit I/F 106 is an interface for outputting an image signal to the printing unit 107, which is a printer engine. The printing unit 107 executes a print job. The print job is a job to be processed for printing on a printing sheet when receiving an instruction from the external device 200, performing copying, receiving a facsimile, and performing media direct printing. Further, the reading unit I/F 108 is an interface for inputting a read image signal from the reading unit 109, which is a scanner engine.

The CPU 102 processes a read image signal that is input from the reading unit I/F 108, and outputs the processed image signal, as a recording image signal, to the printing unit I/F 106. Copying is performed in this way. Further, the CPU 102 processes an image signal that is received from the public line network 114 by the modem 111, and outputs the processed image signal to the printing unit I/F 106. The reception of a facsimile is performed in this way. By contraries, the transmission of a facsimile is performed by processing a read image signal that is input via the reading unit I/F 108, and outputting the processed image signal to the public line network 114 using the modem 111.

Although the configuration herein is such that the printing unit 107 and the reading unit 109 are included in the image forming apparatus 100, at least one of these may be provided outside the image forming apparatus 100.

The USB host 117 is compliant with the USB standard, and is connected via a USB connector 118 to a USB memory 119 that is an external medium compliant with the USB standard. An image file in the USB memory 119 is read into the image forming apparatus 100 via the USB host 117. The CPU 102 processes the image file received from the USB memory 119 via the USB host 117, and outputs the processed image file to the printing unit I/F 106. The media direct printing is performed in this way. The USB memory 119 is an example of a removable medium used during the media direct printing. As the removable medium, various types of other memory cards can be used.

Figure 2:
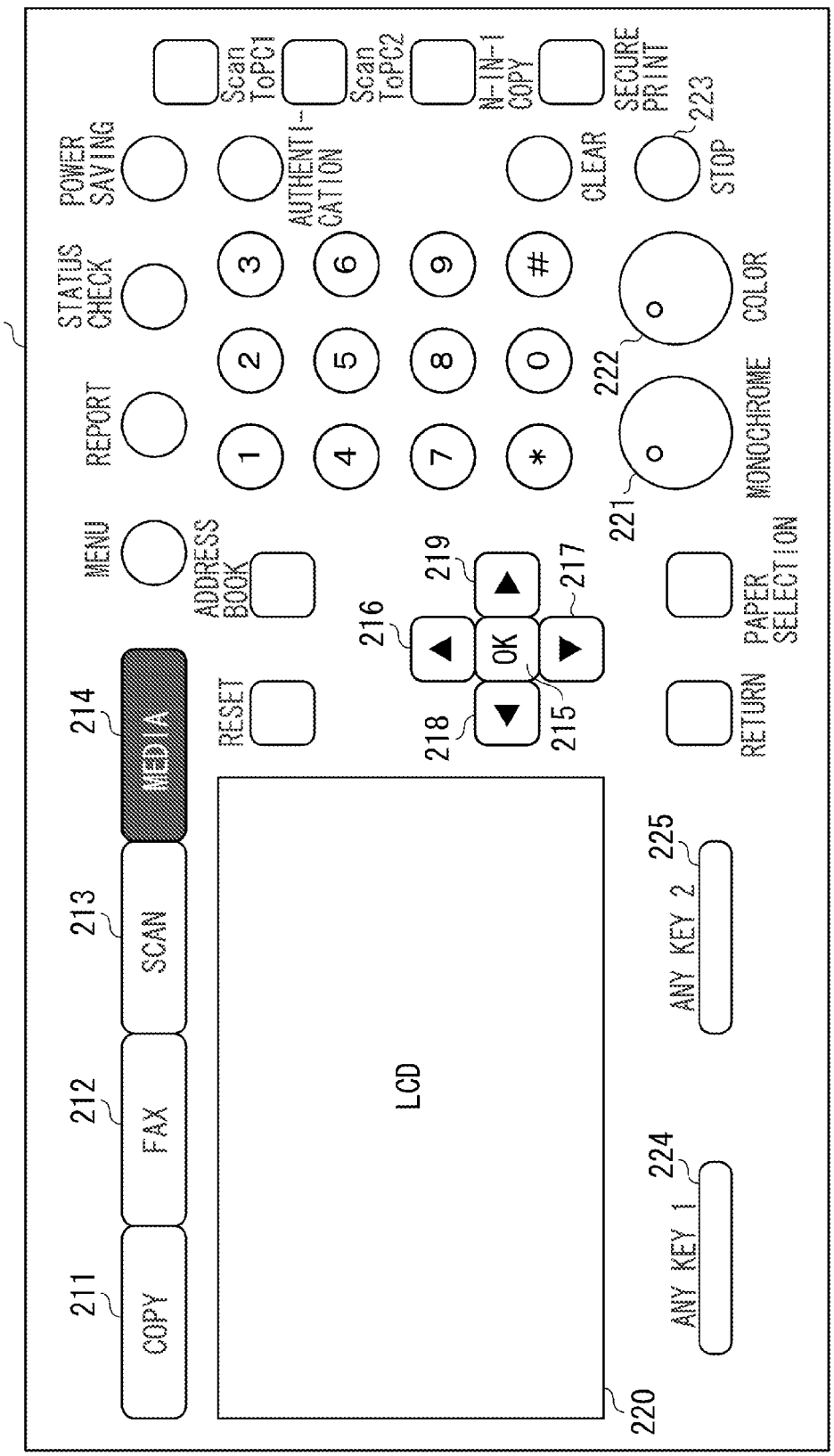
FIG. 2 illustrates a configuration of an operation panel.

FIG. 2 illustrates a configuration of the operation panel 110. The operation panel 110 includes various types of keys that serve as input devices, and a liquid crystal display (hereinafter referred to as an "LCD") 220 that serves as a display unit.

Function keys 211 to 214 are selected when pressed down by a user, and the selected key instructs the controller unit 101 to execute the function assigned to the selected key, so that a basic screen of the function is displayed on the LCD 220. The user selects and inputs an item on the basic screen, thereby setting each function.

To the function key 211, a "COPY" function is assigned. The copy function is enabled when the user presses down the function key 211. When the function key 211 is pressed down, the CPU 102 can operate as a copy function implementation unit that processes a read image signal input from the reading unit I/F 108, and outputs the processed image signal as a recording image signal to the printing unit I/F 106.

To the function key 212, a "FAX" function is assigned. The facsimile function is enabled when the user presses down the function key 212. When the function key 212 is pressed down, the CPU 102 can operate as a facsimile function implementation unit that performs transmission/reception of an image signal via a modem.

To the function key 213, a "SCAN" function is assigned. The scan function is enabled when the user presses down the function key 213. When the function key 213 is pressed down, the CPU 102 can operate as a scan function implementation unit that processes a read image signal input from the reading unit I/F 108.

To the function key 214, a "MEDIA" function is assigned. The media direct printing function is enabled when the user presses down the function key 214. When the function key 214 is pressed down, the CPU 102 can operate as a media direct printing function implementation unit that processes an image file input from the USB host 117, and outputs the processed image file to the printing unit I/F 106.

A selected function key is displayed in a display mode different from the other function keys to indicate that the key has been selected. FIG. 2 illustrates a state where the function key 214 is lit up so that the "MEDIA" function is selected.

Arrow keys 216 to 219 are operation keys for moving up, down, left, and right, respectively to select an item. The user selects an item by using the arrow keys 216 to 219 and determines the selection by using an OK key 215.

A start key 221 for "MONOCHROME" and a start key 222 for "COLOR" execute the media direct printing function when pressed down. Each of the start keys 221 and 222, in a state where it can be pressed down, is lit up to notify the user that the media direct printing function can be executed.

A stop key 223 stops a job that is being processed when pressed down.

Panel keys 224 and 225 are keys to which a function is assigned according to a function that is being executed and to a screen displayed on the LCD 220.

FIGS. 3A to 3E each illustrate an example of a screen displayed on the LCD 220 for guiding operation of selecting an image file to be printed by the media direct printing function.

Figure 3A:
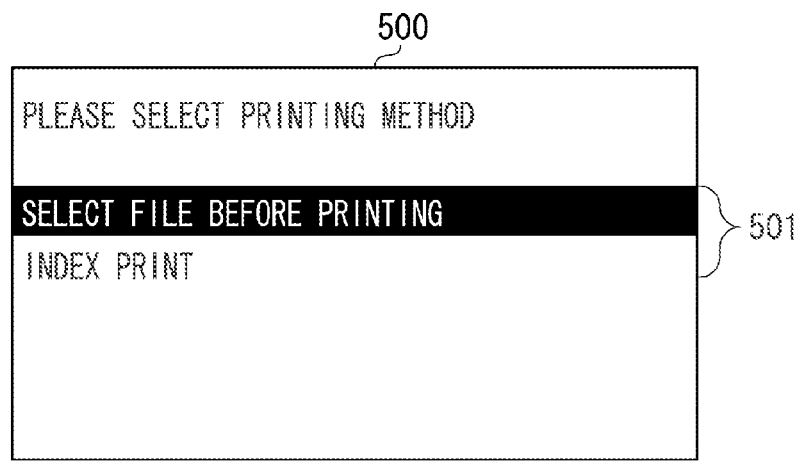
FIGS. 3A to 3E each illustrate an example of display for guiding media direct printing.

FIG. 3A illustrates an example of a basic screen of the media direct printing function, which is displayed on the LCD 220 when the function key 214 is pressed down.

On a basic screen 500, a message that prompts the user to select a printing method is displayed. From selection items 501, either "SELECT FILE BEFORE PRINTING" or "INDEX PRINT" can be selected. The user selects an item from the selection items 501 by using the arrow keys 216 to 219. When the user presses the OK key 215 after the selection, a transition is made to a file browser screen.

Figure 3B:
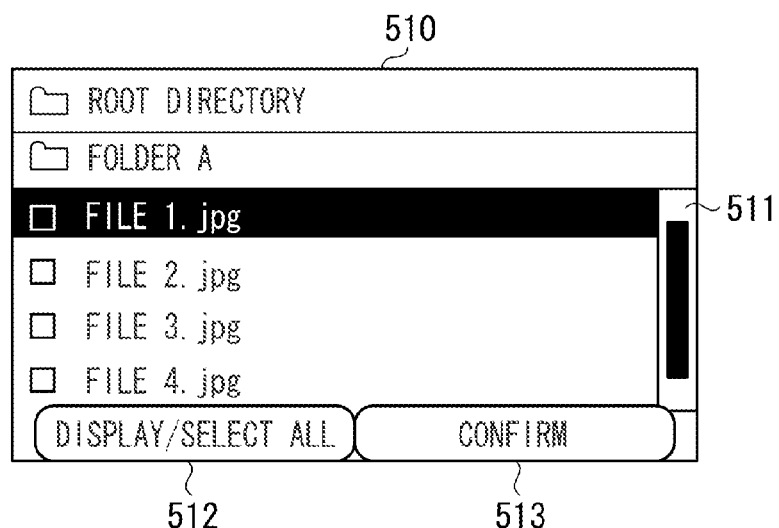

FIG. 3B illustrates an example of the file browser screen. Selection of any one of the selection items 501 illustrated in FIG. 3A causes a transition to the file browser screen 510 illustrated in FIG. 3B.

The file browser screen 510 displays a list of folders and image files that are present in a root directory. The file browser screen 510 is a selection screen in which an image file to be printed can be selected from the list. In a case where all of image files cannot be displayed in the file browser screen 510, a scroll bar 511 is displayed at the right end of the file browser screen 510. At the bottom of the file browser screen 510, a "DISPLAY/SELECT ALL" button 512 and a "CONFIRM" button 513 are displayed. The "DISPLAY/SELECT ALL" button 512 is assigned to the panel key 224, and the "CONFIRM" button 513 is assigned to the panel key 225. These functions are selected when the panel keys 224 and 225 to which the respective functions are assigned are pressed down.

The user selects an image file by using the arrow keys 216 to 219. When the user presses down the OK key 215 after selecting an image file, the selection of the image file to be printed is confirmed. In a case where a folder is selected, a list of image files in the selected folder is displayed on the file browser screen 510. A plurality of image files can be selected as the image files to be printed. By pressing down the OK key 215 in a state in which an image file is selected, the image file is deselected.

In order to select all of image files in the root directory, the panel key 224 is pressed down, so that the "DISPLAY/SELECT ALL" button 512 is selected. Selecting the "DISPLAY/SELECT ALL" button 512 causes a transition to a display/select all screen 520 illustrated in FIG. 3C. Switching to the preview display is performed in a similar manner.

In a case where an image file is individually selected, the panel key 225 is pressed down so that the "CONFIRM" button 513 is selected, whereby a transition is made to a print setting screen for setting the number of copies to be printed, the printing sheet, and the like.

Figure 3C:
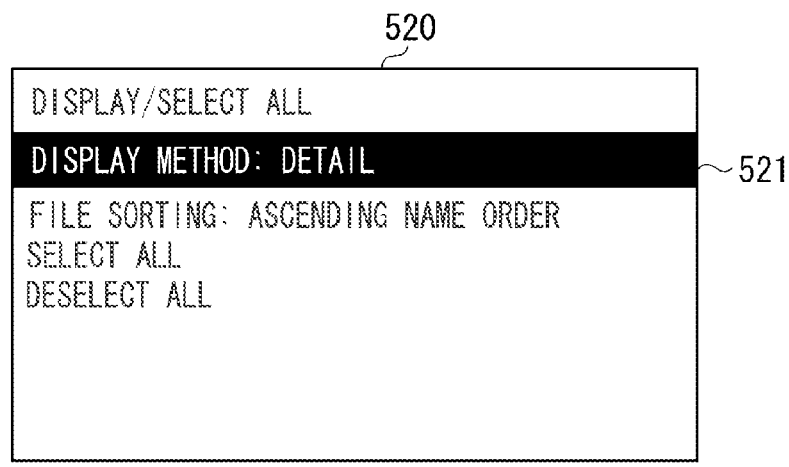

FIG. 3C illustrates an example of the display/select all screen 520.

On the display/select all screen 520, the user can change the method for displaying an image file, sort files, and select/deselect all image files. The user selects a desired item by using the arrow keys 216 to 219, and presses down the OK key 215, thereby confirming the selected item.

In the example illustrated in FIG. 3C, a transition is made to a display method change screen 530 by selecting a "DISPLAY METHOD" 521.

Figure 3D:
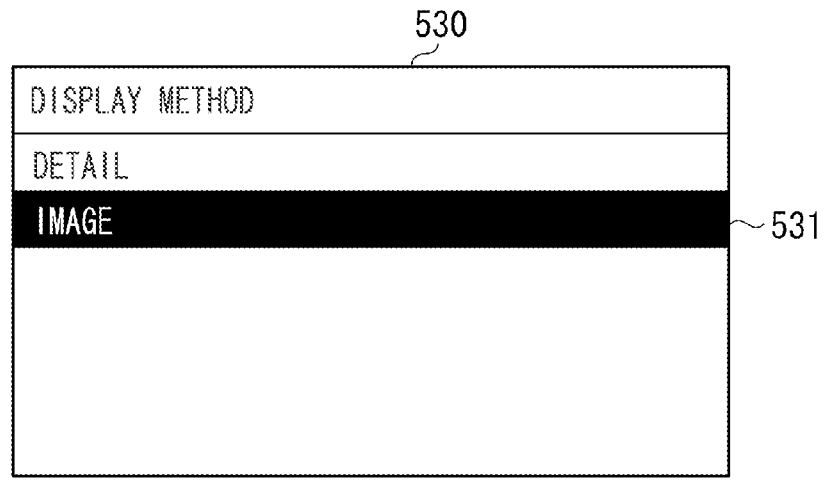

FIG. 3D illustrates an example of the display method change screen 530.

On the display method change screen 530, the user can switch between a "DETAIL" display (list display) and "IMAGE" display (preview display). The user selects a desired item by using the arrow keys 216 to 219, and presses down the OK key 215, thereby confirming the selected item. In FIG. 3D, since "IMAGE" is selected, the preview display is performed.

The list display is, for example, a display of image file names alone as illustrated in FIG. 3B, which does not involve image processing. Not only image file names but also attribute information thereof such as date/time of creation (storage) of an image file and file format may be displayed. The preview display is processing that involves image processing, as it is intended to generate a preview image. Thus, the list display is a display method that does not require a specific resource for the image processing to be used for preview display.

Figure 3E:
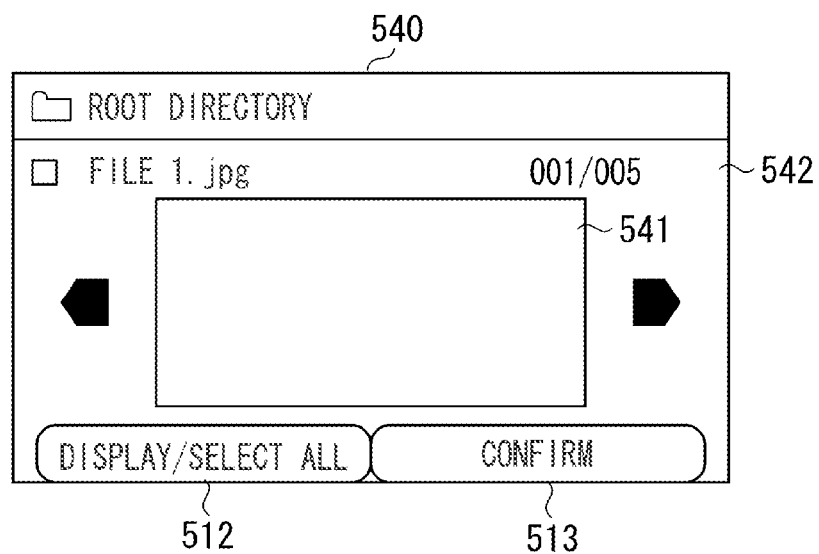

FIG. 3E illustrates an example of a preview screen 540 displayed in the preview display.

The preview screen 540 displays the hierarchical level of a folder that includes an image file to be preview-displayed, the file name of the image file, and a position 542 of the image file to be preview-displayed with respect to the total number of files in the folder. Further, a preview image of the image file is displayed in an image display area 541. The preview screen 540 is a selection screen on which an image file to be printed can be selected from preview images. By pressing down the OK key 215, the displayed image file can be selected. By pressing down the OK key 215 in a state in which the image file is selected, the image file is deselected. The image file to be preview-displayed can be changed by using the "LEFT" arrow key 218 and the "RIGHT" arrow key 219. By pressing down the OK key 215 after the switching, a plurality of image files can be selected.

In a case where at least one image file is selected similarly to the list display as illustrated in FIG. 3B, the "CONFIRM" button 513 is selected by pressing down the panel key 225. Selecting the "CONFIRM" button 513 causes a transition to the print setting screen.

Thus, the file browser screen 510 (list display) illustrated in FIG. 3B and the preview screen 540 (preview display) illustrated in FIG. 3E are selection screens for the selection of an image file to be printed. The user selects an image file to be printed, on these selection screens. As mentioned above, the list display does not use a resource for the image processing to be used for preview display. Therefore, even in a case where a conflict occurs over the resource for image processing due to a print job during the media direct printing, the user can select an image file using the list display, preventing impairment of the usability for the user.

Figure 4A:
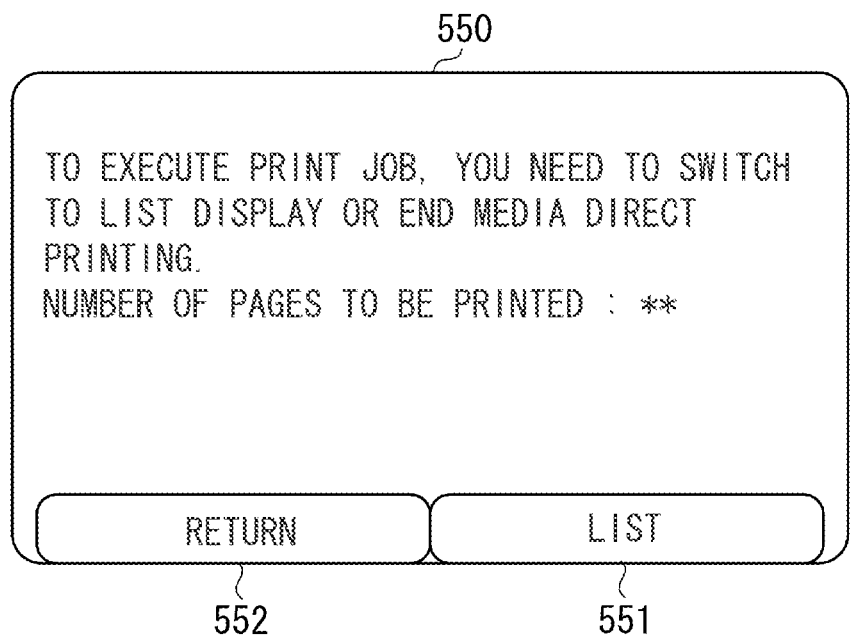
FIGS. 4A and 4B each illustrate an example of display of a pop-up screen when a resource conflict occurs.
Figure 4B:
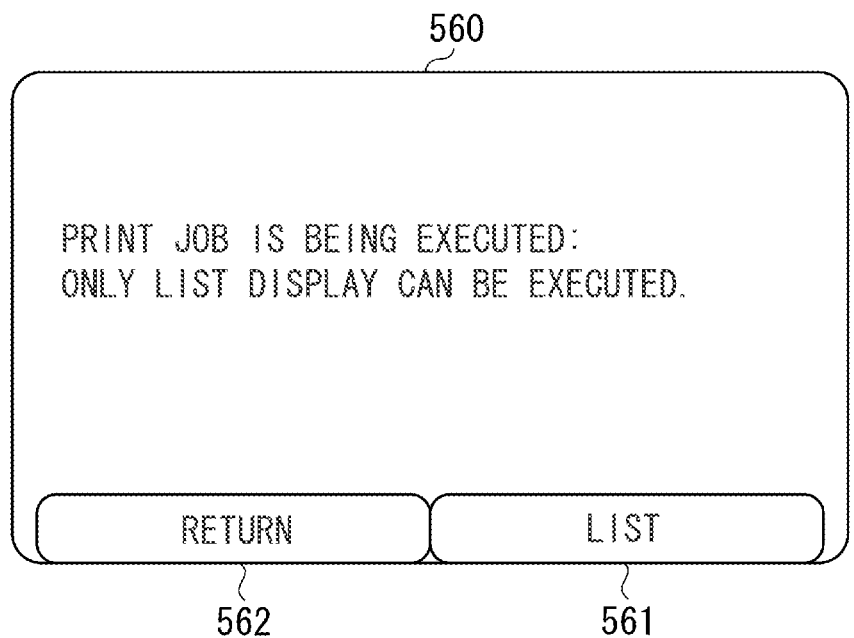

FIGS. 4A and 4B each illustrate an example of pop-up screen to be displayed when a resource conflict occurs between an image preview function of the media direct printing function and a print job, which is other processing performed using the same resource as that used in the preview function.

FIG. 4A is an example of a pop-up screen 550 to be displayed when an instruction for execution of a print job is issued by the external device 200 during the execution of the image preview function. The pop-up screen 550 indicates that the print job can be executed by switching the display method in the image preview function or by ending the media direct printing function. When the panel key 224 is pressed down, a "RETURN" button 552 is selected. When the panel key 225 is pressed down, a "LIST" button 551 is selected. When the "RETURN" button 552 is selected, the image preview function remains continued. When the "LIST" button 551 is selected, the preview screen 540 as illustrated in FIG. 3E is switched to the list display as illustrated in FIG. 3B.

Further, the pop-up screen 550 displays the number of pages to be printed for a print job. The user can select, based on the number of pages to be printed, either continuing the image preview function or switching to the list display.

FIG. 4B is an example of the pop-up screen 560 to be displayed when an instruction for using the image preview function is issued during the execution of a print job. The pop-up screen 560 notifies the user that since a print job is being executed, it is impossible to display the preview screen 540, and it is only possible to perform the list display. When the panel key 224 is pressed down, a "RETURN" button 562 is selected. When the panel key 225 is pressed down, a "LIST" button 561 is selected. When the "RETURN" button 562 is selected, the image preview function is not executed. When the "LIST" button 561 is selected, the list display as illustrated in FIG. 3B is performed.

Figure 5A:
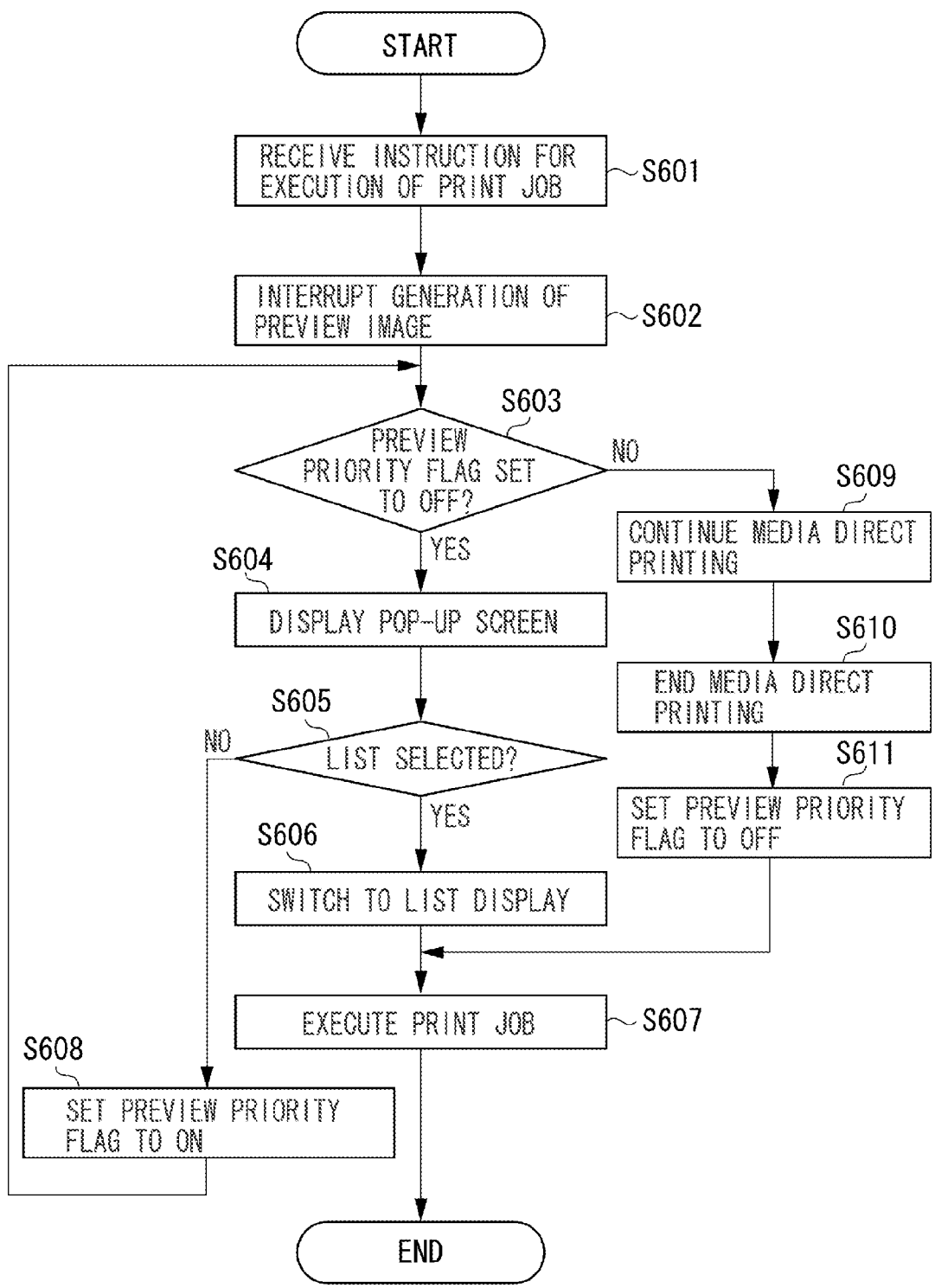

FIG. 5A is a flowchart illustrating a processing procedure to be performed in a case where an execution instruction of a print job is issued during the execution of the image preview function of the media direct printing function.

In steps S601, when a print job is received during the execution of the image preview function, then in step S602, the CPU 102 determines that a conflict occurs over the resource for image processing and interrupts the generation of a preview image. This allows the resource used in the generation of the preview image to be released.

In step S603, the CPU 102 checks a preview priority flag after interrupting the generation of the preview image. An instruction is issued regarding whether the image preview function should be processed with a higher priority than the other job that causes the resource conflict (which is a print job in the present exemplary embodiment), depending on the state of the preview priority flag. The CPU 102 stores the preview priority flag in the RAM 103, and sets the preview priority flag as required. The CPU 102 normally sets the preview priority flag to "off".

If the preview priority flag is set to "off" (YES in step S603), then in step S604, the CPU 102 displays on the LCD 220 the pop-up screen 550 as illustrated in FIG. 4A for prompting the user to switch the display.

When the user selects the "LIST" button 551 on the pop-up screen 550 (YES in step S605), then in step S606, the CPU 102 switches the preview screen 540 to the list display as illustrated in FIG. 3B. In step S607, the CPU 102 executes the print job after switching to the list display. Similar processing is carried out, not only in the case of selecting the "LIST" button 551, but also in the case where the user does not select any button in step S605 and a time-out occurs. The CPU 102 can allocate the resource for image processing to the print job by switching the preview screen 540 to the list display. Therefore, quick execution of the print job is enabled.

When the user selects the "RETURN" button 552 on the pop-up screen 550 (NO in step S605), then in step S608, the CPU 102 sets the preview priority flag to "on", and the processing returns to step S603.

Since the preview priority flag is set to "on" (NO in step S603), then in step S609, the CPU 102 continues the media direct printing function. In step S610, when the media direct printing function has been completed, then in step S611, the CPU 102 sets the preview priority flag to "off" and the processing proceeds to step S607. In step S607, the CPU 102 executes the print job.

As described above, when an execution instruction of a print job is issued during the execution of the image preview function of the media direct printing function, the image forming apparatus 100 prompts a user to select which to prioritize, the continuation of the media direct printing function, or the execution of the print job. Since the image preview function of the media direct printing function and the print job conflict with each other for the resource for image processing, a CMFP that has a small number of resources has to prioritize either of them. Therefore, in a case where a print job is executed, the preview image is switched to the list display, which does not need a resource for image processing, whereby the resource to be used for the print job is ensured. In a case where the media direct printing function is continued, the print job is executed after the media direct printing function is completed. Therefore, even if there are a small number of resources, processes between which a resource conflict would occur can be executed without impairing the usability for the user.

FIG. 5B is a flowchart illustrating a processing procedure to be performed in a case where an execution instruction of the image preview function of the media direct printing function is issued during the execution of a print job.

In step S701, in a case where an instruction for execution of processing that involves the generation of a preview screen is issued during the execution of a print job, the CPU 102 determines that a conflict occurs over a resource for image processing. In step S702, if the CPU 102 determines that the conflict occurs, the CPU 102 displays on the LCD 220 the pop-up screen 560 for prompting the user to select the list display as illustrated in FIG. 4B.

In step S703, when the user selects the "RETURN" button 562 on the pop-up screen 560 (NO in step S703), the CPU 102 ends the processing. In this case, the print job continues to be executed, and a preview screen is not generated. The processing ends in a similar manner, not only in the case of selecting the "RETURN" button 562, but also in the case where the user does not select any button in step S703 and a time-out occurs.

In step S703, when the user selects the "LIST" button 561 on the pop-up screen 560 (YES in step S703), then in step S704, the CPU 102 executes the list display as illustrated in FIG. 3B, as a selection screen for selecting an image file.

As described above, when an instruction for executing the image preview function of the media direct printing function is issued during the execution of a print job as described above, the image forming apparatus 100 notifies the user that only the list display can be performed. Since the print job and the image preview function of the media direct printing function conflict with each other for the resource for image processing, an image preview function cannot be provided in parallel with a print job that is being executed, in a CMFP having a small number of resources. Therefore, influences on a print job are reduced by switching the preview screen to the list display that does not need a resource for image processing. The media direct printing function is executed after the print job is completed. Therefore, even if there are a small number of resources, processes between which a resource conflict occurs can be executed without impairing the usability for a user.

FIG. 6 is a flowchart illustrating a processing procedure according to a second exemplary embodiment in a case where an instruction for executing the image preview function of the media direct printing function is issued during the execution of a print job. The image forming apparatus 100 has a configuration similar to that in the first exemplary embodiment. In the second exemplary embodiment, unlike the first exemplary embodiment, a pop-up screen as illustrated in FIG. 4B is not displayed.

In step S801, in a case where an instruction for execution of processing that involves the generation of a preview screen is issued during the execution of a print job, the CPU 102 determines that a conflict occurs over the resource for image processing. In step S802, if the CPU 102 determines that the conflict occurs, the CPU 102 informs the user on the LCD 220 that the image preview function cannot be used. Subsequently, in step S803, the CPU 102 performs the list display as illustrated in FIG. 3B.

According to the present exemplary embodiment, the display is shifted automatically to the list display, without displaying the pop-up screen 560 described with reference to FIG. 4B in the first exemplary embodiment. As a result, a user does not have to select either the display of the preview screen 540 or the list display, which enhances the usability for the user.

In a third exemplary embodiment, among the media direct printing function and a print job, either one processing executed before the other is exclusively executed with priority. The image forming apparatus 100 has a configuration similar to that in the first exemplary embodiment.

FIG. 7A is a flowchart illustrating a processing procedure to be performed in a case where an instruction for executing a print job is issued during the execution of the media direct printing function.

In step S901, in a case where an instruction for executing a print job is issued during the execution of the media direct printing function, the CPU 102 determines that a conflict occurs over the resource for image processing. In step S902, when the CPU 102 determines that the conflict occurs, the CPU 102 places the execution of the print job in a standby state until the media direct printing function is completed, and informs the user on the LCD 220 that printing cannot be executed since the media direct printing function is being executed (NO in step S903). When the media direct printing function is completed (YES in step S903), then in step S904, the CPU 102 executes the print job.

Figure 7B:
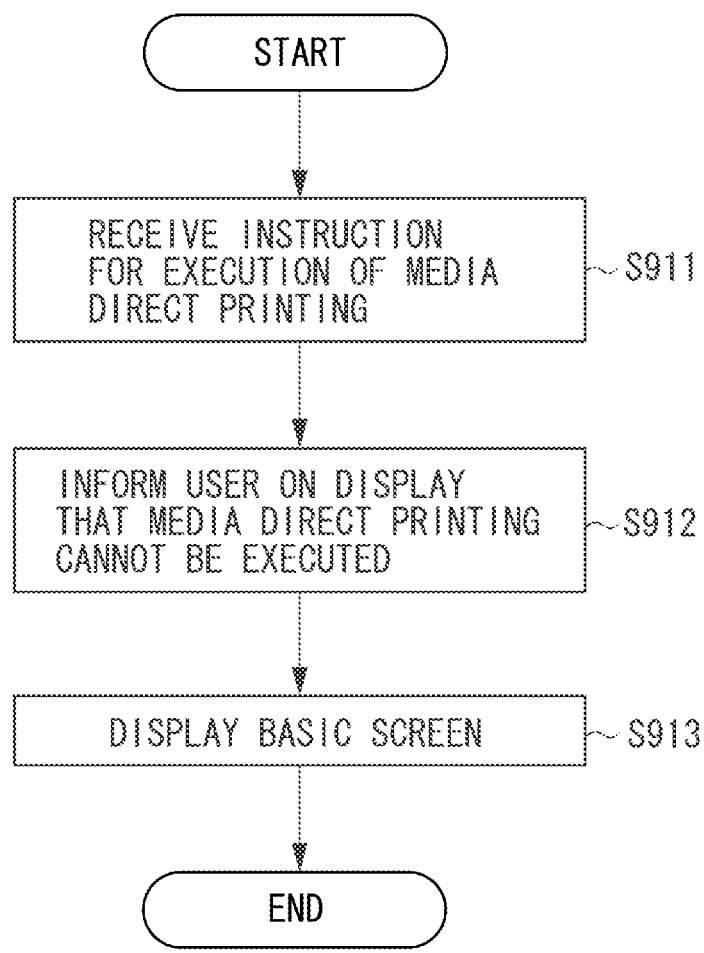

FIG. 7B is a flowchart illustrating a processing procedure to be performed in a case where an instruction for execution of the media direct printing function is issued during the execution of a print job.

In step S911, in a case where an instruction for execution of the media direct printing function is issued during execution of a print job, the CPU 102 determines that a conflict occurs over the resource for image processing. In step S912, when the CPU 102 determines that the conflict occurs, the CPU 102 informs the user on the LCD 220 that the media direct printing function cannot be executed since the print job is being executed. Then, in step S913, when the print job is completed, the CPU 102 displays the basic screen 500 illustrated in FIG. 3A.

As described above, in the third exemplary embodiment, exclusive control of the media direct printing and the print job is performed. Further, since a user is notified that processing cannot be executed since other processing has been executed, confusion between a user who conducts media direct printing and a user who conducts a print job can be prevented.

According to the above-described exemplary embodiments, when a resource conflict occurs, an image file can be selected on a second selection screen that is generated without using the resource. Therefore, even when a resource conflict occurs, processing can be executed efficiently.

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these embodiments are not seen to be limiting. The scope of the following claims is to be accorded the broadest interpretation so as to encompass all such modifications and equivalent structures and functions.

This application claims the benefit of Japanese Patent Application No. 2013-075973 filed Apr. 1, 2013, which is hereby incorporated by reference herein in its entirety.

What is claimed is:

1. A printing apparatus comprising:
   a display control unit configured to generate a preview image of an image file stored in a memory and provide a preview display of a generated preview image on a display unit, using a resource for image processing; and
   an execution unit, implemented with a processor in communication with a memory, configured to execute a print job received from an external apparatus using the resource,
   wherein, if the print job is received from the external apparatus during the preview display of the preview image generated from the image file stored in the memory, the display control unit performs control to display an inquiry screen for inquiring with a user whether to change, without using the resource, the preview display to a list display of a list of file names of image files stored in the memory.

2. The printing apparatus according to claim 1, wherein the memory is a removable medium,
   wherein the printing apparatus further comprises a connection unit for connecting the removable medium thereto, and
   wherein the display control unit provides a preview display of a preview image of an image file stored in the removable medium that is connected to the printing apparatus via the connection unit.

3. The printing apparatus according to claim 1, wherein, if the preview display is changed to the list display, the execution unit executes the print job after changing the preview display to the list display is completed.

4. The printing apparatus according to claim 1, wherein, if the preview display is not changed to the list display, the display control unit continues to provide the preview display and the execution unit stands by to execute the print job until the preview display is finished.

5. A printing apparatus comprising:
   a display control unit configured to generate a preview image of an image file stored in a memory and provide a preview display of a generated preview image on a display unit, using a resource for image processing; and
   an execution unit, implemented with a processor in communication with a memory, configured to execute a print job received from an external apparatus using the resource,
   wherein, if an instruction for providing the preview display is issued during the execution of the print job, the display control unit performs control to display an inquiry screen for inquiring with a user whether to provide, without using the resource, a list display of a list of file names of image files stored in the memory instead of the preview display.

6. The printing apparatus according to claim 5, wherein the memory is a removable medium,
   wherein the printing apparatus further comprises a connection unit for connecting the removable medium thereto, and
   wherein the display control unit provides a preview display of a preview image of an image file stored in the removable medium that is connected to the printing apparatus via the connection unit.

7. The printing apparatus according to claim 5, wherein, if an instruction for providing the list display is issued, the preview display is changed to the list display.

8. A method for controlling a printing apparatus, the method comprising:

generating a preview image of an image file stored in a memory and providing a preview display of the generated preview image, using a resource for image processing;

executing a print job received from an external apparatus using the resource; and displaying an inquiry screen for inquiring with a user whether to change the preview display of the preview image generated from the image file stored in the memory to a list display of a list of file names of image files stored in the memory if the print job is received from the external device during the preview display.

9. A method for controlling a printing apparatus, the method comprising:

generating a preview image of an image file stored in a memory and providing a preview display of the generated preview image, using a resource for image processing;

executing a print job received from an external apparatus using the resource; and displaying a an inquiry screen for inquiring with a user whether to display, without using the resource, a list display of a list of file names of image files stored in the memory instead of the preview display if the print job is received from the external apparatus during the preview display.

10. A non-transitory computer-readable storage medium storing a program that causes a computer to execute the method according to claim 8.

11. A non-transitory computer-readable storage medium storing a program that causes a computer to execute the method according to claim 9.

* * * * *